(12) United States Patent
Suzuki et al.

(10) Patent No.: US 7,084,600 B2
(45) Date of Patent: Aug. 1, 2006

(54) POWER CONTROL APPARATUS FOR A TURBO CHARGER EQUIPPED WITH AN ASSIST MOTOR AND A MOTOR DRIVEN TURBO CHARGING APPARATUS

(75) Inventors: Tamaki Suzuki, Oobu (JP); Masami Fujitsuna, Kariya (JP); Hisaharu Morita, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/895,391

(22) Filed: Jul. 21, 2004

(65) Prior Publication Data

US 2005/0017672 A1    Jan. 27, 2005

(30) Foreign Application Priority Data

Jul. 25, 2003    (JP)   ............................. 2003-280231

(51) Int. Cl.
*H02P 27/04*    (2006.01)

(52) U.S. Cl. ...................... 318/802; 318/811; 318/800; 318/140; 318/808; 290/52; 290/32

(58) Field of Classification Search ................ 318/802, 318/139, 140, 147, 151, 153, 157, 743; 290/52; 322/32

See application file for complete search history.

(56) References Cited

U.S. PATENT DOCUMENTS

| | | | | |
|---|---|---|---|---|
| 4,600,872 A | * | 7/1986 | Shepard, Jr. ................. | 318/658 |
| 4,626,763 A | * | 12/1986 | Edwards ..................... | 318/811 |
| 4,730,242 A | * | 3/1988 | Divan ........................ | 363/37 |
| 4,757,686 A | * | 7/1988 | Kawamura et al. ........... | 60/608 |
| 4,935,684 A | * | 6/1990 | Watanabe .................... | 318/729 |
| 5,068,590 A | * | 11/1991 | Glennon et al. .............. | 322/10 |
| 5,798,631 A | * | 8/1998 | Spee et al. .................... | 322/25 |
| 6,170,587 B1 | * | 1/2001 | Bullock ...................... | 180/69.6 |
| 6,175,217 B1 | * | 1/2001 | Da Ponte et al. ............. | 322/19 |
| 6,204,627 B1 | * | 3/2001 | Watanabe et al. ........... | 318/729 |
| 6,233,935 B1 | * | 5/2001 | Kahlon et al. ............. | 60/605.1 |
| 6,242,884 B1 | * | 6/2001 | Lipo et al. ................... | 318/808 |
| 6,265,786 B1 | * | 7/2001 | Bosley et al. ................. | 290/52 |
| 6,281,595 B1 | * | 8/2001 | Sinha et al. ............. | 290/40 A |
| 6,404,655 B1 | * | 6/2002 | Welches ...................... | 363/41 |
| 6,437,535 B1 | * | 8/2002 | Sinha ........................ | 318/800 |
| 6,449,950 B1 | | 9/2002 | Allen et al. | |
| 6,462,429 B1 | * | 10/2002 | Dhyanchand et al. ......... | 290/31 |

(Continued)

FOREIGN PATENT DOCUMENTS

WO    WO 02/23047 A1    3/2002

OTHER PUBLICATIONS

Uchida, "Trend of Variable Turbochagers: VGT, VNT," Engine Technology, vol. 5, No. 1, pp. 20-25, 2003.

*Primary Examiner*—Marlon T. Fletcher
*Assistant Examiner*—Renata McCloud
(74) *Attorney, Agent, or Firm*—Oliff & Berridge, PLC (57) ABSTRACT

A power control apparatus includes an inverter giving a rectangular waveform drive signal to an induction motor, an inverter voltage controlling section controlling an output voltage of the inverter, a converter boosting a voltage supplied to the inverter, a converter voltage controlling section controlling an output voltage of the converter, and a control signal generating section that controls the inverter voltage controlling section in a low-rotational speed region and controls the converter voltage controlling section in a high-rotational speed region.

7 Claims, 7 Drawing Sheets

U.S. PATENT DOCUMENTS

| | | | |
|---|---|---|---|
| 6,481,406 B1 * | 11/2002 | Pels | 123/179.3 |
| 6,631,080 B1 * | 10/2003 | Trimble et al. | 363/34 |
| 6,703,719 B1 * | 3/2004 | McConnell | 290/52 |
| 6,710,495 B1 * | 3/2004 | Lipo et al. | 310/184 |
| 6,713,887 B1 * | 3/2004 | Shimizu et al. | 290/40 C |
| 6,737,762 B1 * | 5/2004 | Koenig | 307/48 |
| 6,750,633 B1 * | 6/2004 | Schreiber | 322/12 |
| 6,774,608 B1 * | 8/2004 | Hofstetter et al. | 322/24 |
| 6,787,933 B1 * | 9/2004 | Claude et al. | 290/52 |
| 6,801,019 B1 * | 10/2004 | Haydock et al. | 322/17 |
| 6,812,586 B1 * | 11/2004 | Wacknov et al. | 290/52 |
| 6,831,442 B1 * | 12/2004 | Hsu et al. | 318/803 |
| 6,870,279 B1 * | 3/2005 | Gilbreth et al. | 290/52 |
| 6,882,060 B1 * | 4/2005 | Matsuo et al. | 290/52 |
| 6,888,263 B1 * | 5/2005 | Satoh et al. | 290/52 |
| 6,894,455 B1 * | 5/2005 | Cai et al. | 318/771 |
| 2002/0020381 A1 * | 2/2002 | Pels | 123/179.3 |
| 2002/0064695 A1 * | 5/2002 | Raiser | 429/13 |
| 2002/0089310 A1 * | 7/2002 | Shimizu et al. | 322/17 |
| 2003/0012038 A1 * | 1/2003 | Welches et al. | 363/34 |
| 2003/0015873 A1 * | 1/2003 | Khalizadeh et al. | 290/7 |
| 2003/0020419 A1 * | 1/2003 | Ichinose et al. | 318/140 |
| 2003/0048651 A1 * | 3/2003 | Trimble et al. | 363/125 |
| 2003/0140880 A1 * | 7/2003 | Kahlon et al. | 123/179.3 |
| 2004/0008010 A1 * | 1/2004 | Ebrahim et al. | 322/44 |
| 2004/0041404 A1 * | 3/2004 | McConnell | 290/52 |
| 2004/0080164 A1 * | 4/2004 | McKelvey et al. | 290/52 |
| 2004/0100149 A1 * | 5/2004 | Lai | 307/82 |
| 2004/0264089 A1 * | 12/2004 | Furuya et al. | 361/92 |

* cited by examiner

POWER CONTROL APPARATUS FOR A TURBO CHARGER EQUIPPED WITH AN ASSIST MOTOR AND A MOTOR DRIVEN TURBO CHARGING APPARATUS

BACKGROUND OF THE INVENTION

The present invention relates to a power control apparatus for a motor assisted turbo charger and also relates to a motor driven turbo charging apparatus.

There is a conventional turbo charger including an induction motor, which is hereinafter referred to as a motor-equipped turbo charger. The induction motor assists the turbo charger to rotate its rotary shaft with better response so that the turbo charger can speedily increase the rotational speed (for example, as disclosed in the U.S. Pat. No. 6,449,950 or in the International Publication No. 02/23047).

For example, the motor-equipped turbo charger operates in a very wide rotational speed region ranging from a low speed region (e.g. $1 \times 10^4$ rpm to $2 \times 10^4$ rpm) corresponding to an engine idling condition to an ultra-high speed region (e.g. approximately $20 \times 10^4$ rpm) corresponding to an engine full load condition. The motor-equipped turbo charger is thus required to quickly increase its rotational speed within a short time (e.g. approximately 1 sec.) so as to operate in such a very wide rotational speed region. The rotational speed of $20 \times 10^4$ rpm (referred to as the ultra-high speed region in this invention) corresponds to 10 times to 100 times the rotational speed of a conventional motor installed on a vehicle. Such severe operating conditions force the motor-equipped turbo charger to encounter with later-described power control problems.

To attain high response required for rapidly increasing the rotational speed in a short time, the motor-equipped turbo charger needs to generate a very large output torque and accordingly a very large amount of electric power must be supplied to the motor of the turbo charger. According to a car of 2,000 CC displacement, the electric power level required for a motor of the turbo charger to attain the above-described performances is 1.5 kW to 5.6 kW (for example, refer to "Trend of Variable Turbochargers: VGT, VNT" by Hiroshi UCHIDA, Engine Technology, Vol. 5, No. 1, February 2003, p. 20 to p. 25).

First Problem

There is only one power controlling device available for supplying electric power to the motor. When an inverter performs a variable power control (i.e. duty ratio control) by giving a waveform drive signal (i.e. waveform field signal) to the motor, this inverter must withstand a large current of 470A at maximum to supply a large electric power of 1.5 kW to 5.6 kW to the motor when a vehicle battery voltage is 12V. Accordingly, inverter transistors installed on this inverter must withstand such a large current. However, the cost of transistor increases in proportion to square or cube of its receptive current value. The power control apparatus becomes expensive if such expensive inverter transistors are used.

Second Problem

If the inverter performs the variable power control (i.e. the duty ratio control), a heat amount generated from the inverter will rise up to 560 W when the inverter receives electric power of 5.6 kW on the assumption that the converting efficiency is 90%. The generated heat (i.e. internal loss) is primarily a power supply loss in the transistors and secondarily a switching loss caused when the waveform drive signal is duty ratio controlled at higher frequencies in the ultra-high speed region. Each of these losses causes the inverter transistors to generate heat in a concentrated manner.

The turbo charger is usually attached to an exhaust pipe of an engine. The power control apparatus installed in the inverter is thus located in the vicinity of a heated exhaust pipe and a high-temperature engine. In other words, there is a higher possibility that the power control apparatus is subjected to very severe thermal conditions. Hence, it is necessary to assure a sufficient thermal safety margin for the power control apparatus.

In this case, considering the fact that the generated heat tends to concentrate on the inverter transistors, reducing the heat to be generated from the inverter is a key factor in enhancing the thermal safety margin of the power control apparatus.

Third Problem

If a vehicle is in a traveling condition, the engine load conditions will change every moment. The motor equipped to the turbo charger is thus required to momentarily adjust its rotational speed in accordance with the changed engine load conditions. For example, automotive vehicles are often forced to repeat stop and acceleration in urban areas. Under such driving conditions, the motor must perform a reliable driving operation in the entire rotational speed region ranging from a lower speed region of $1 \times 10^4$ rpm to $2 \times 10^4$ rpm to an ultra-high speed region of, for example, approximately $20 \times 10^4$ rpm. Furthermore, an automotive vehicle may need to overtake a preceding vehicle on a highway. In such a case, the motor must assure a reliable accelerating performance of the vehicle in an intermediate rotational speed region ranging from a mid speed region of, for example, approximately $10 \times 10^4$ rpm to an ultra-high speed region of, for example, approximately $20 \times 10^4$ rpm. Furthermore, when the vehicle is traveling on an ascending road, the motor must assure a reliable driving operation in the ultra-high speed region for a long time.

However, simultaneously controlling both the voltage and the frequency of the inverter transistors throughout the entire rotational speed region will raise various problems, such as excessive load or short lifetime, in the actual use of the inverter transistors.

Fourth Problem

In general, the waveform drive signal given to an induction motor to equalize an actual rotational speed with a target rotational speed (i.e. drive command) is a sine waveform signal. The ultra-high speed region (e.g. approximately $20 \times 10^4$ rpm) represents the full load and high rotational speed region of a turbo charger. In this ultra-high speed region, forming a sine wave by controlling a duty ratio based on PWM (i.e. Pulse Width Modulation) requires a high-performance calculating device (e.g. CPU) for a power control apparatus to assure very quick response of the turbo charger, which will increase the cost of the power control apparatus.

SUMMARY OF THE INVENTION

In view of the above-described problems, the present invention has the following objects.

A first object of the present invention is to reduce a current value received by each transistor installed in a power control apparatus, thereby reducing the cost of transistors and as a result reducing the cost of the power control apparatus.

A second object of the present invention is to decentralize the heat concentrated on the transistors installed in the power control apparatus, thereby enhancing the thermal safety margin.

A third object of the present invention is to reduce the burden of respective transistors installed in the power control apparatus, thereby enhancing the reliability of the power control apparatus.

A fourth object of the present invention is to use a rectangular waveform drive signal (i.e. a rectangular waveform field signal given to an exciting coil) throughout the entire rotational speed region to eliminate the control burden for forming a sine wave (especially, in the ultra-high speed region), thereby lowering the cost of the power control apparatus.

In order to accomplish the above and other related objects, the present invention provides a power control apparatus for a motor-equipped turbo charger, including an inverter for giving a waveform drive signal to an induction motor driving a rotary shaft of a turbo charger in accordance with a rotational speed, inverter voltage controlling means for controlling an output voltage of the inverter, a converter for boosting a voltage supplied to the inverter, and converter voltage controlling means for controlling an output voltage of the converter.

According to the present invention, the power control apparatus for a motor-equipped turbo charger includes the converter for boosting the voltage supplied to the inverter. Hence, the present invention increases the voltage supplied to the inverter which gives the waveform drive signal to the induction motor. The current value received by the inverter transistors is small. Thus, the present invention reduces the cost of the inverter transistors and accordingly reduces the cost of the power control apparatus.

Furthermore, as both the inverter and the converter cooperatively perform the power control, the present invention can reduce the heat concentrated on the inverter. A part of the generated heat is released to the converter. As a result, even if the power control apparatus is installed to a portion subjected to severe thermal circumstances, the present invention can assure a satisfactory thermal safety margin for each of the inverter and the converter. Namely, the present invention can enhance the thermal safety margin of the power control apparatus.

Furthermore, as both the inverter and the converter cooperatively perform the power control, the present invention reduces the burden of the inverter transistors which simultaneously control the voltage and the frequency. Accordingly, the present invention assures a long lifetime for respective transistors and enhances the reliability of the power control apparatus. Furthermore, decentralizing the burden to respective transistors of the inverter and the converter is effective in enhancing the reliability of the power control apparatus.

Preferably, the power control apparatus for a motor-equipped turbo charger in accordance with the present invention further includes a control signal generating section for performing a frequency control for increasing a frequency of the waveform drive signal in accordance with an increase in the target rotational speed of the induction motor, performing an inverter boosting control for increasing the output voltage of the inverter in accordance with an increase of the target rotational speed in a low-rotational speed region of the induction motor, and performing a converter boosting control for increasing the output voltage of the converter in accordance with an increase of the target rotational speed in a high-rotational speed region of the induction motor.

This arrangement can enhance the flexibility of the power control performed in the power control apparatus.

The characteristics of this arrangement will be explained in more detail with reference to a practical example.

When an automotive vehicle starts accelerating from a stopped condition, the motor will be required to operate properly in a wide speed region ranging from a low speed region of $1 \times 10^4$ rpm to $2 \times 10^4$ rpm up to an ultra-high speed region. In this case, the inverter first performs a variable power control and subsequently the converter performs a variable power control to smoothly increase the rotational speed of the turbo charger. On the other hand, when the vehicle starts accelerating in an intermediate driving condition, only the converter performs the variable power control to realize a smooth rise of the rotational speed. When the vehicle is continuously traveling on an ascending road or under other high load conditions, it is possible to supply a large amount of electric power to the induction motor by maintaining a higher amplification degree in each of the inverter and the converter. In this manner, the inverter and the converter cooperatively optimize the power control in every rotational speed region, which can enhance the flexibility of the power control. Thus, it becomes possible to lower the control load of the power control apparatus.

Preferably, in the power control apparatus for a motor-equipped turbo charger in accordance with the present invention, the waveform drive signal given to the induction motor has a rectangular waveform throughout an entire rotational speed region.

In general, an induction motor has a low torque ripple at low speeds starting from 0 rpm and accordingly a sine waveform drive signal is often used to enable the induction motor to stably generate a startup toque. The operational speed region of general induction motors ranges from 0 rpm to several thousands rpm. On the other hand, when an engine is in the idling condition, the turbo charger continuously receives an exhaust pressure and can maintain a rotational speed of $1 \times 10^4$ rpm to $2 \times 10^4$ rpm. In this respect, the induction motor equipped to a turbo charger is different from a general-purpose induction motor in that its initial speed is not 0 rpm and in a higher level of $1 \times 10^4$ rpm to $2 \times 10^4$ rpm which exceeds the upper rotational speed limit of the general-purpose induction motors.

Namely, the induction motor for a turbo charger requires no initial drive torque for increasing the rotational speed from 0 rpm. Thus, there is no necessity of supplying a sine waveform drive signal. Furthermore, even when a rectangular wave voltage is applied to a motor rotating at the speed of $1 \times 10^4$ rpm to $2 \times 10^4$ rpm, the current waveform deforms into a pseudo sine wave. Accordingly, there is no necessity of forming a sine wave based on the PWM control. The induction motor can increase its rotational speed up to the ultra-high speed region with a high drive torque and high response. Therefore, it becomes possible to lower the control load of the power control apparatus. The cost can be reduced.

Preferably, in the power control apparatus for a motor-equipped turbo charger in accordance with the present invention, the inverter voltage controlling means controls an output voltage of the inverter based on a duty ratio control and the converter voltage controlling means controls an output voltage of the converter based a duty ratio control.

In this case, the duty ratio control is performed by variably changing the ratio of ON time and OFF time in 1 cycle (i.e. 1 cycle of duty frequency). This ratio is generally referred to as a duty ratio.

Preferably, in the power control apparatus for a motor-equipped turbo charger in accordance with the present invention, the converter includes a multi-phase chopper type boosting circuit whose phase number is equivalent to a boosting ratio. A choke coil connected to a battery power source and a converter transistor controlling the power supply to this choke coil cooperatively consist of each phase of the multi-phase chopper type boosting circuit. Using the chopper type boosting circuit having the phase number equivalent to the boosting ratio is effective in increasing the boosting efficiency and in suppressing the load of each converter transistor.

Furthermore, using the chopper type boosting circuit having the phase number equivalent to the boosting ratio is effective in obtaining substantially a constant boosted current and in suppressing the ripple of a boosted voltage.

Furthermore, in order to accomplish the above and other related objects, the present invention provides a motor driven turbo charging apparatus including a turbo charger, a multi-phase induction motor for driving a rotary shaft of the turbo charger, and a power supply circuit for supplying electric power to the induction motor, wherein the power supply circuit includes a converter circuit for boosting an input voltage, an inverter circuit for converting an output voltage of the converter circuit into a multi-phase power and supplying the multi-phase power to the induction motor, and the converter circuit is a multi-phase converter circuit.

According to the motor driven turbo charging apparatus of the present invention, the multi-phase converter circuit boosts the voltage supplied to the induction motor to drive a turbo charger. Adopting the multi-phase induction motor and the multi-phase inverter circuit brings the effect of reducing each phase current in the converter circuit in addition to decentralizing the drive current and reducing each phase current. Therefore, the motor driven turbo charging apparatus of the present invention can drive the induction motor under a large amount of supplied electric power without being restricted by a limited current capacity of the switching element disposed in each phase. As a result, it becomes possible to promptly accelerate the turbo charger up to a higher rotational speed.

Preferably, in the motor driven turbo charging apparatus in accordance with the present invention, the induction motor has a 6-phase winding, the inverter circuit has a 6-phase bridge circuit including switching elements provided for respective phases, and the converter circuit has a 6 or less-phase switching circuit including switching elements provided for respective phases.

Adopting the induction motor of a 6-phase winding is effective in reducing the current supplied to each phase winding and in reducing a cross section of the conductor of the winding. Thus, it becomes possible to provide an induction motor having a practical size for a motor driven turbo charger.

Furthermore, having a 6-phase bridge circuit in the switching circuit is effective in reducing the current flowing in the switching element of each bridge circuit. This improves the durability and heat resistance and downsizes the heat releasing structure.

Furthermore, it becomes possible to use low-cost switching elements with small current capacities.

Furthermore, the switching circuit can be arranged to have a high-side switching element and a low-side switching element. Furthermore, having a 6 or less-phase switching circuit in the converter circuit brings the effects similar to those of the inverter circuit. The converter circuit can include, for example, a three-phase switching circuit. Each switching circuit can be constituted by a chopper type boosting circuit.

Preferably, in the motor driven turbo charging apparatus in accordance with the present invention, the power supply circuit includes a frequency control section for controlling a switching frequency of the inverter circuit, an inverter voltage control section for controlling an output voltage of the inverter circuit by adjusting a switching duty ratio of the inverter circuit, and a converter voltage control section for controlling an output voltage of the converter circuit by adjusting the switching of the converter circuit. The inverter voltage control section and the converter voltage control section are arranged so as to increase respective output voltages in accordance with an increase of a rotational speed of the induction motor. The inverter voltage control section controls the output voltage in a first rotational speed region, and the converter voltage control section controls the output voltage in a second rotational speed region including a region higher than the first rotational speed region.

It is possible to set the first rotational speed region and the second rotational speed region as mutually different rotational speed regions that do not overlap each other. For example, the first rotational speed region and the second rotational speed region are continuous with no overlap between them. Alternatively, the first rotational speed region and the second rotational speed region are separated from each other.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Best Mode 1

The present invention provides a power control apparatus for a motor-equipped turbo charger including an inverter giving a waveform drive signal of a rectangular wave to an induction motor driving a rotary shaft of a turbo charger in accordance with a rotational speed, inverter voltage controlling means for controlling an output voltage of the inverter, a converter for increasing a voltage supplied to the inverter, and converter voltage controlling means for controlling an output voltage of the converter.

Best Mode 2

In addition to the arrangement of the above-described best mode 1, the power control apparatus for a motor-equipped turbo charger further performs an inverter boosting control in accordance with an increase of the target rotational speed in a low-rotational speed region of the induction motor, and also performs a converter boosting control in accordance with an increase of the target rotational speed in a high-rotational speed region of the induction motor.

Preferred Embodiment

A preferred embodiment of the present invention will be explained with reference to FIGS. 1 to 7.

A motor driven turbo charging apparatus includes a motor-equipped turbo charger 1 and a power control apparatus 3 (including a power supply circuit) controlling an induction motor 2 incorporated in this motor-equipped turbo charger 1.

Motor-Equipped Turbo Charger 1

Figure 7:
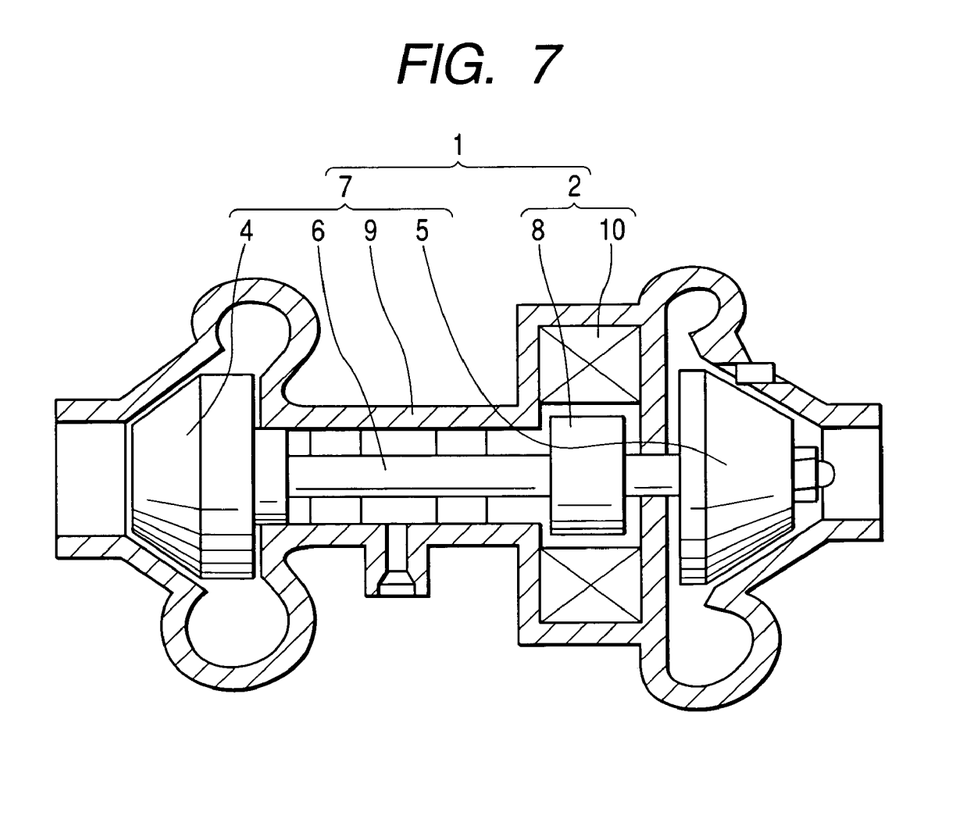
FIG. 7 is a cross-sectional view schematically showing a motor-equipped turbo charger in accordance with the preferred embodiment of the present invention.

First of all, the motor-equipped turbo charger 1 will be explained with reference to FIG. 7.

The motor-equipped turbo charger 1 chiefly consists of a turbo charger 7 and an induction motor 2. The turbo charger 7 includes a turbine 4 that is rotated (i.e. driven) by an exhaust gas flow of an engine, a compressor 5 that is rotated (i.e. driven) by the turbine 4 to compress intake air, and a rotary shaft 6 connecting the turbine 4 and the compressor 5. The induction motor 2 is capable of driving the rotary shaft 6 of the turbo charger 7.

The induction motor 2 disclosed in this preferred embodiment includes a rotor 8 (e.g. permanent magnet) fixed around the rotary shaft 6 and a stator 10 fixed to a housing 9 of the turbo charger 7. Furthermore, a 6-phase exciting coil 11 consisting of U, V, W, X, Y, and Z phases (refer to FIG. 2) is firmly fixed to the stator 10.

Characteristics of Preferred Embodiment

Next, a power control apparatus 3 will be explained with reference to FIGS. 1 to 6.

The power control apparatus 3 controls electric power supplied to the 6-phase exciting coil 11 so as to control the rotational speed of the rotor 8. Namely, the power control apparatus 3 is for assisting controlling the turbo charger 7 based on the control of electric power supplied to the 6-phase exciting coil 11. The turbo charger 7 operates in a very wide rotational speed region ranging from a low speed region of $1 \times 10^4$ rpm to $2 \times 10^4$ rpm corresponding to an engine idling condition to an ultra-high speed region (for example, approximately $20 \times 10^4$ rpm) corresponding to an engine full load condition. Accordingly, the power control apparatus 3 is required to rapidly increase the rotational speed of the induction motor 2 from the lower level of $1 \times 10^4$ rpm to $2 \times 10^4$ rpm up to the upper level of the full load ultra-high speed region in a short time (for example, approximately 1 sec).

To rapidly increase the rotation of the turbo charger 7 in a short time, the induction motor 2 needs to generate a very large torque. To this end, a very large amount of electric power (for example, 1.5 kW to 5.6 kW) is supplied to the induction motor 2.

Relying only on the inverter 12 to control a very large amount of electric power (based on a duty ratio control) will raise the following problems.

(1) When a vehicle battery 13 generates a voltage of 12V, the inverter 12 must receive a large current (for example, 470A) and accordingly require expensive inverter transistors 14 constituting this inverter 12. As a result, the power control apparatus 3 becomes expensive.

(2) The heat generated as the internal loss and the switching loss resulting from the power control will concentrate on the inverter transistors 14. Therefore, the thermal safety margin of the inverter 12, i.e. the thermal safety margin of the power control apparatus 3, will not be maintained to a satisfactory level.

(3) Enforcing the inverter transistors 14 to variably control both the voltage and the frequency simultaneously throughout the entire rotational speed region will impart a large burden on the inverter transistors 14. This will cause various problems such as shortened lifetime in the practical use of these transistors.

(4) In a case that a sine waveform drive signal is given to the exciting coil 11 of the induction motor 2, the power control apparatus 3 will require an excellent calculating device (e.g. CPU) having very high response to form a sine wave based on a duty ratio control in the ultra-high speed region (for example, approximately $20 \times 10^4$ rpm) such as a full load and high rotational speed region of the turbo charger 7.

Power Control Apparatus 3

To solve the above-described problems, the power control apparatus 3 of the preferred embodiment of the present invention includes the inverter 12, an inverter voltage controlling section 15 (i.e. a PWM generating section 15 shown in FIG. 1), a converter 16, a converter voltage controlling section 17 (i.e. a PWM generating section 17 shown in FIG. 1), and a signal generating section 18. The inverter 12 gives a waveform drive signal to the induction motor 2 in accordance with a rotational speed. The inverter voltage controlling section 15 controls an output voltage of the inverter 12. The converter 16 boosts a voltage supplied to the inverter 12. The converter voltage controlling section 17 controls an output voltage of the converter 16. And, the signal generating section 18 generates various control signals.

The arrangement of the power control apparatus 3 in accordance with a preferred embodiment will be explained hereinafter in more detail.

Figure 1:
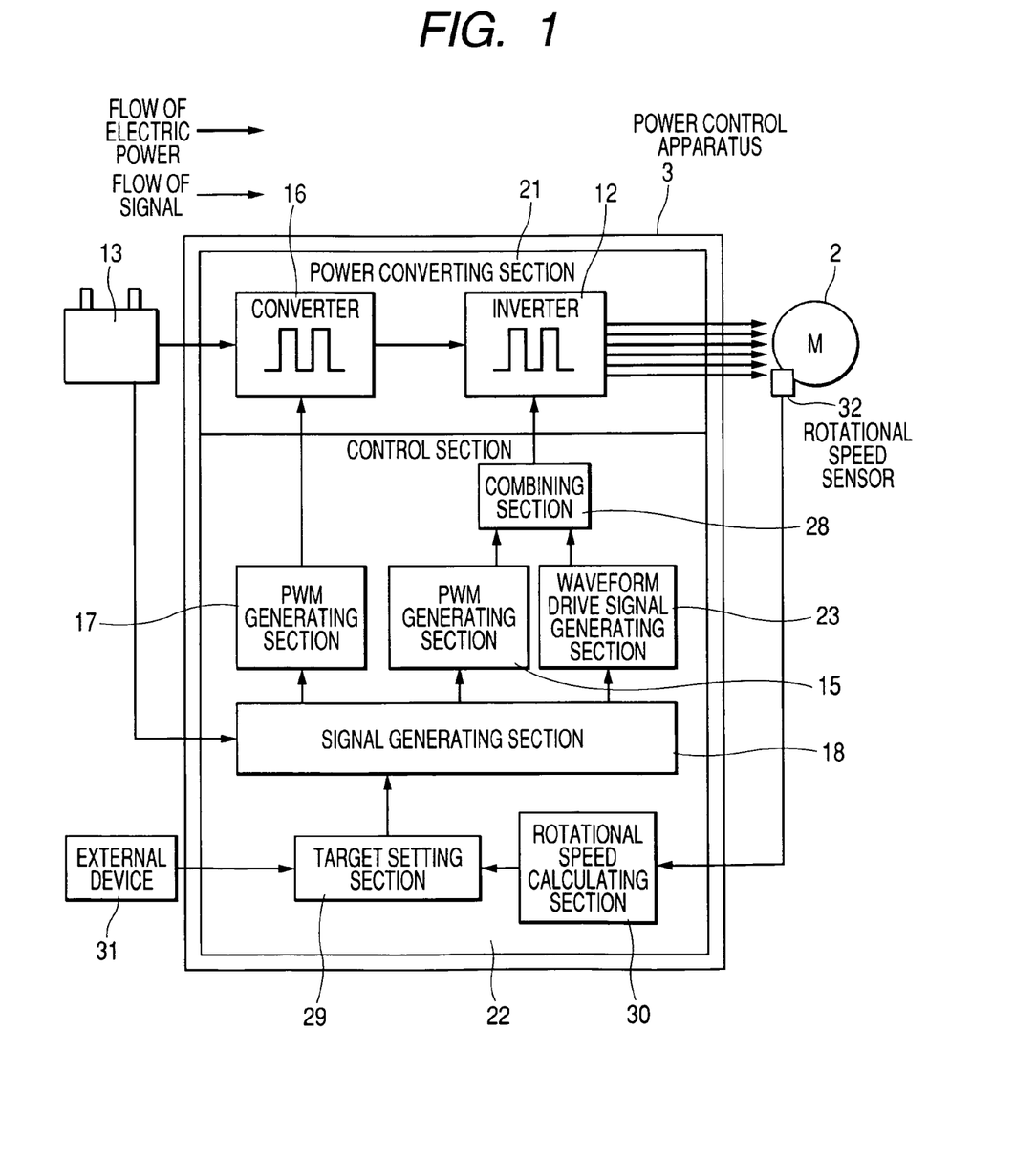
FIG. 1 is a schematic block diagram showing a power control apparatus in accordance with a preferred embodiment of the present invention.

The power control apparatus 3, as shown in FIG. 1, chiefly consists of a power converting section 21 and a control section 22. The power converting section 21 gives a waveform drive signal (i.e. waveform field signal) having a frequency corresponding to a rotational speed and electric power to the induction motor 2. The control section 22 controls the power converting section 21.

Power Converting Section 21

The power converting section 21 chiefly consists of the inverter 12 and the converter 16 as described above.

Figure 2:
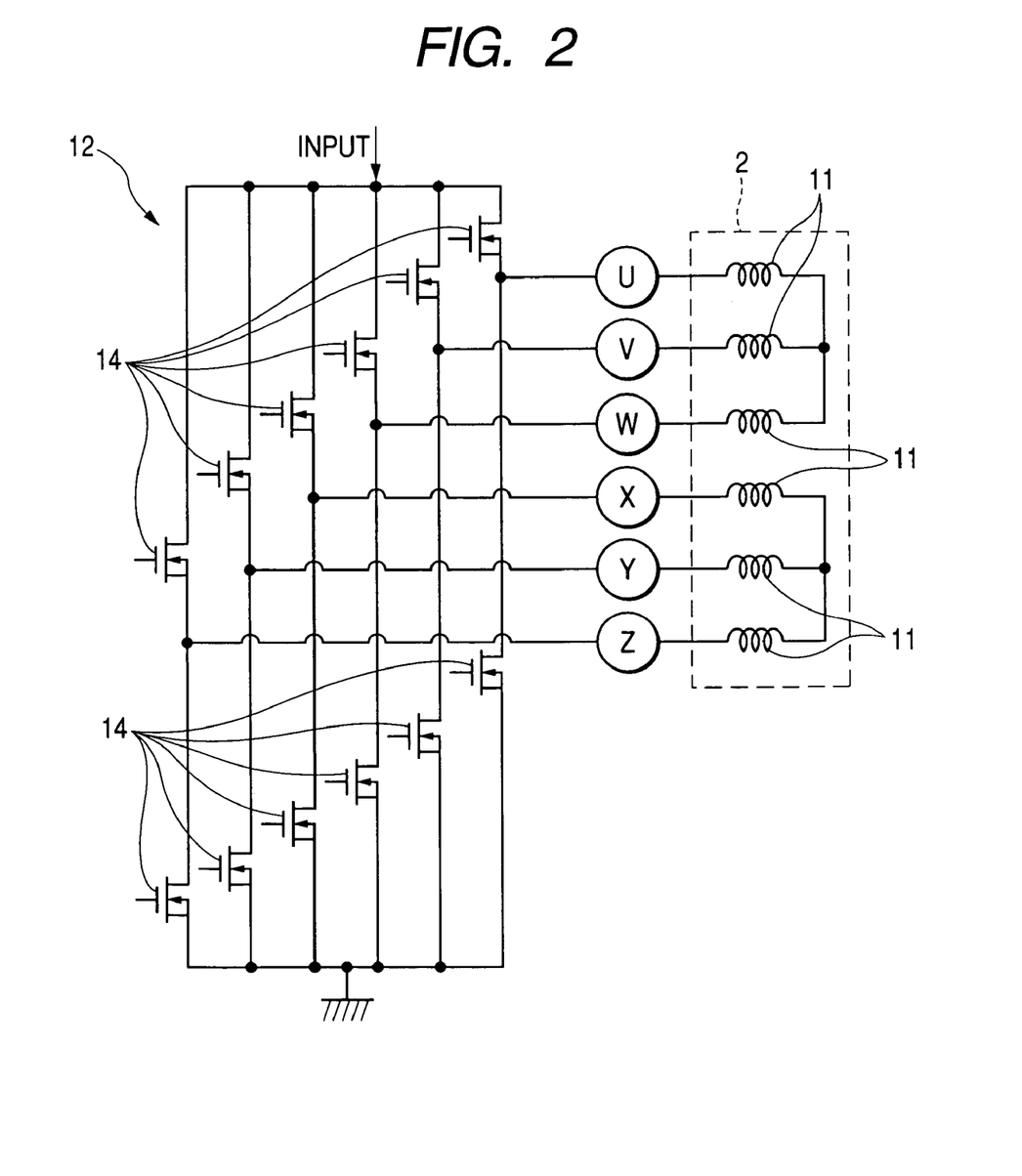
FIG. 2 is a circuit diagram showing an inverter in accordance with the preferred embodiment of the present invention.
Figure 3:
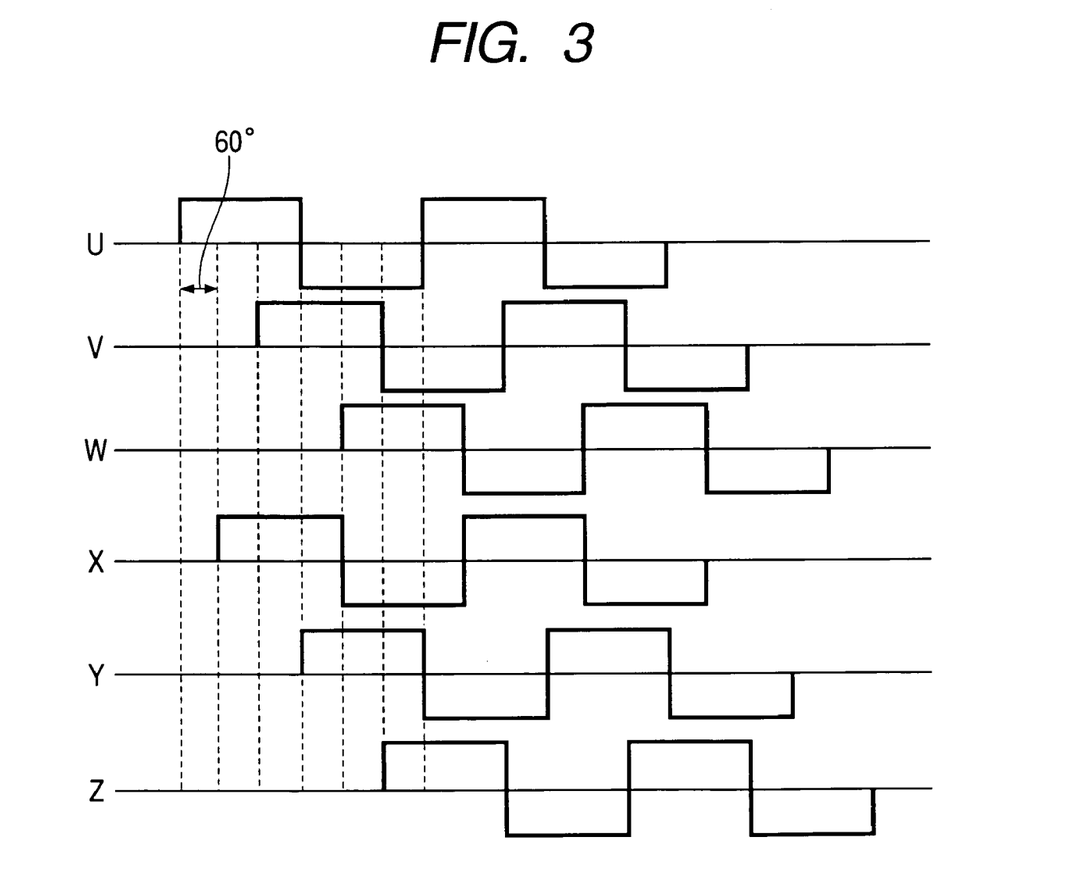
FIG. 3 is a diagram showing waveform drive signals of the inverter in accordance with the preferred embodiment of the present invention.

The inverter 12 has a function of variably controlling both the frequency and the voltage of the waveform drive signal. As shown in FIG. 2, the inverter 12 includes numerous inverter transistors 14 (serving as switching elements of the present invention) capable of switching the electric power supply condition of the exciting coil 11 (U, V, W, X, Y, and Z phases) of the induction motor 2. Respective inverter transistors 14 are successively switch controlled in response to the control signal generated from a later-described waveform drive signal generating section 23, in such a manner that rectangular waveform signals are successively supplied to respective phases of the exciting coil 11 with an electric angle phase shift of 60° as shown in FIG. 3.

The inverter 12 performs a power control in a low-rotational speed region and a frequency control in the entire rotational speed region as described later.

Figure 4:
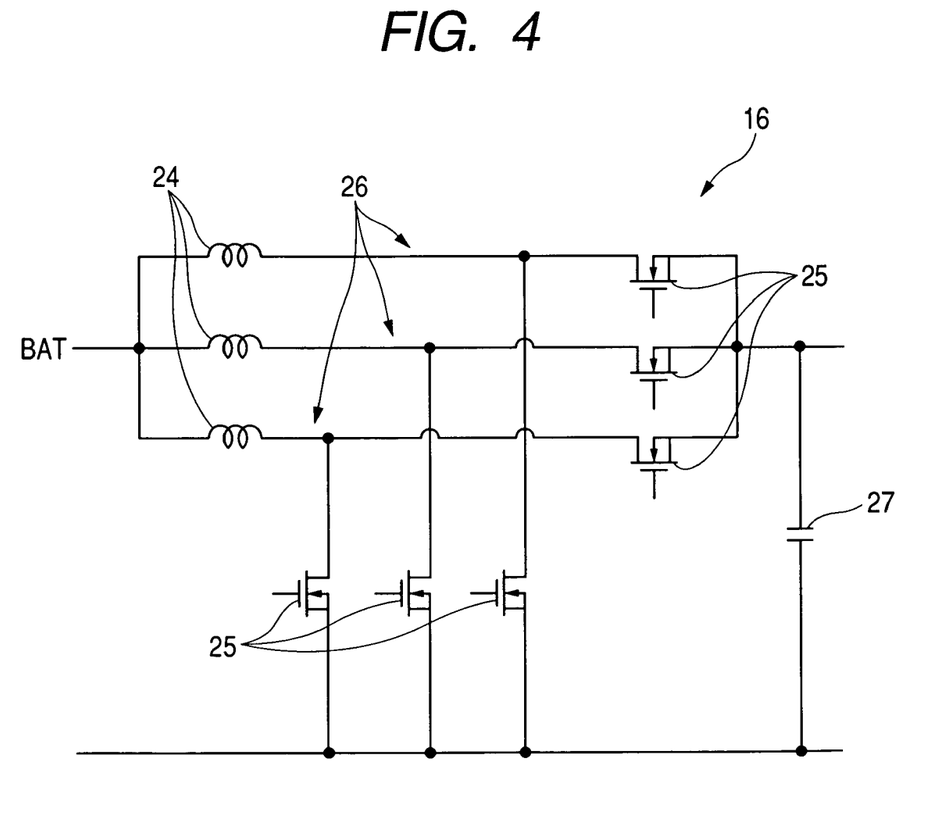
FIG. 4 is a circuit diagram showing a converter in accordance with the preferred embodiment of the present invention.

The converter 16 has a function of variably controlling the voltage applied to the inverter 12. As shown in FIG. 4, the converter 16 includes a three-phase chopper type boosting circuit 26 consisting of a choke coil 24 and a converter transistor 25 for each phase. The choke coil 24 is connected to a battery. The converter transistor 25 (serving as the switching element) has a function of on-and-off controlling the electric power supplied to its associated choke coil 24. A capacitor 27 temporarily stores a boosted voltage of each phase.

Figure 5:
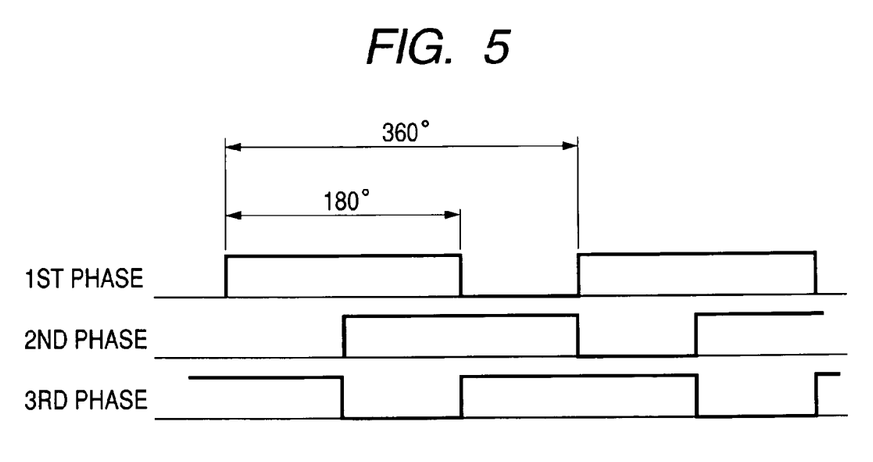
FIG. 5 is a diagram showing operation waveforms of the converter in accordance with the preferred embodiment of the present invention.

The control section 22 successively switch controls respective converter transistors 25 so that each phase has an electric power supply period of 180° in the electric angle 360°, as shown in FIG. 5.

In this manner, the three-phase chopper type boosting circuit 26 can obtain a boosted voltage corresponding to three times the battery voltage through the switching operation of respective phases as shown in FIG. 5. Thus, the boosting efficiency is high. The load of each converter transistor 25 is small. Furthermore, using the three-phase chopper type boosting circuit 26 is advantageous in that the boosted current is substantially constant and the boosted voltage has no ripple. The converter 16 performs a power control in a higher-rotational speed region as described later.

Control Section 22

The control section 22 includes a waveform drive signal generating section 23, a combining section 28, a target setting section 29, and a rotational speed calculating section 30 in addition to the inverter voltage controlling section 15, the converter voltage controlling section 17, and the control signal generating section 18.

The inverter voltage controlling section 15 performs a duty ratio control for variably controlling the electric power supply time of respective inverter transistors 14, thereby realizing a voltage control (i.e. PWM control) of the inverter 12. The duty ratio control is for changing the ON time and the OFF time in 1 cycle of the duty frequency. The duty ratio represents the ratio of the ON time.

The converter voltage controlling section 17, like the control of the inverter 12, performs a duty ratio control for variably controlling the electric power supply time of respective converter transistors 25, thereby realizing a voltage control (i.e. PWM control) of the converter 16.

The waveform drive signal generating section 23 has a function of causing the exciting coil 11 to generate a waveform drive signal of a rectangular wave having a frequency corresponding to the target rotational speed based on the signal given from the control signal generating section 18.

The combining section 28 has a function of (for example, as an AND circuit) combining an output signal of the inverter voltage controlling section 15 and an output signal of the waveform drive signal generating section 23, thereby controlling respective inverter transistors 14.

The target setting section 29 has a function of setting a target rotational speed based on a comparison between a command value of an external device 31 and an actual speed of the turbo charger 7 (i.e. the induction motor 2 in this embodiment) supplied from the rotational speed calculating section 30. In this case, the external device 31 determines an assist amount given to the turbo charger 7 with reference to an engine rotational speed, an accelerator opening degree, a required engine torque and others.

The rotational speed calculating section 30 has a function of calculating an actual speed of the turbo charger 7 (i.e. the induction motor 2) based on a pickup signal obtained by a rotational speed sensor 32 attached to the induction motor 2.

Figure 6A:
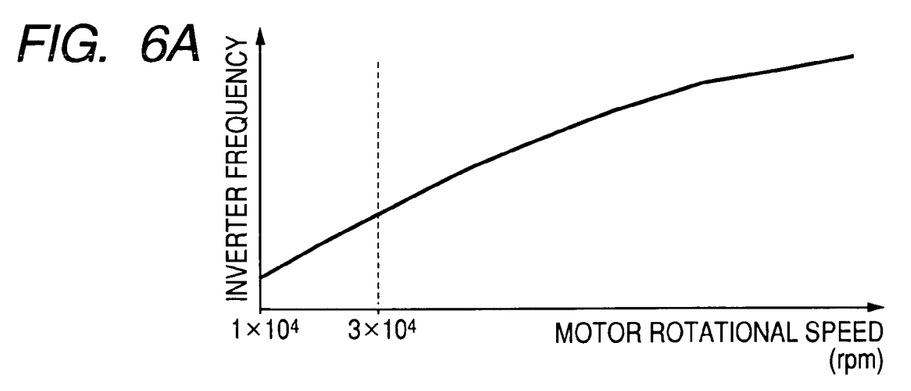
FIG. 6A is a graph showing a relationship between an inverter frequency (i.e. a frequency of the waveform drive signal) and a motor rotational speed in accordance with the preferred embodiment of the present invention.

The control signal generating section 18, as shown in FIG. 6A, controls the above-described waveform drive signal generating section 23 in accordance with an increase of the target rotational speed of the induction motor 2 which is set by the target setting section 29, thereby realizing a frequency control for increasing the frequency of the waveform drive signal (refer to FIG. 3). This operation corresponds to a function of the frequency control section of the present invention.

Figure 6B:
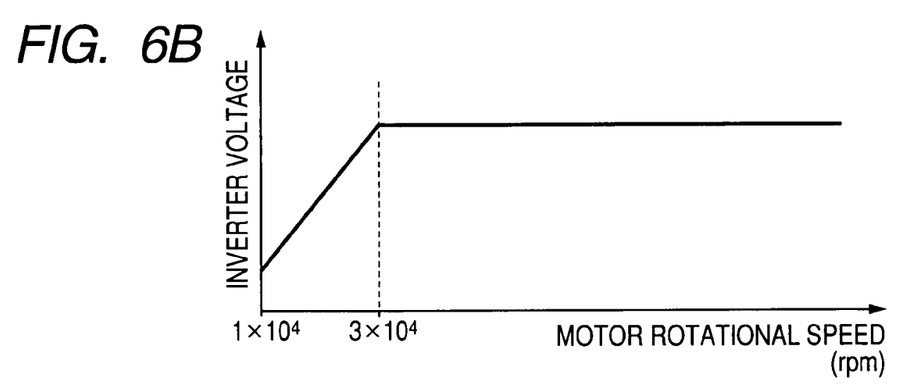
FIG. 6B is a graph showing a relationship between an inverter voltage (i.e. an output voltage of the inverter) and the motor rotational speed in accordance with the preferred embodiment of the present invention.

Furthermore, the control signal generating section 18, as shown in FIG. 6B, controls the above-described inverter voltage controlling section 15 in accordance with an increase of the target rotational speed in the low-rotational speed region of the induction motor 2 (for example, in the speed range from $1 \times 10^4$ rpm to $3 \times 10^4$ rpm), thereby realizing an inverter boosting control for increasing the output voltage of the inverter 12. This operation corresponds to a function of the inverter voltage control section of this invention. More specifically, when the target rotational speed given from the target setting section 29 is in the low-rotational speed region, the control signal generating section 18 controls the duty ratio in the inverter voltage controlling section 15 in such a manner that a generated inverter voltage corresponds to the target rotational speed.

Figure 6C:
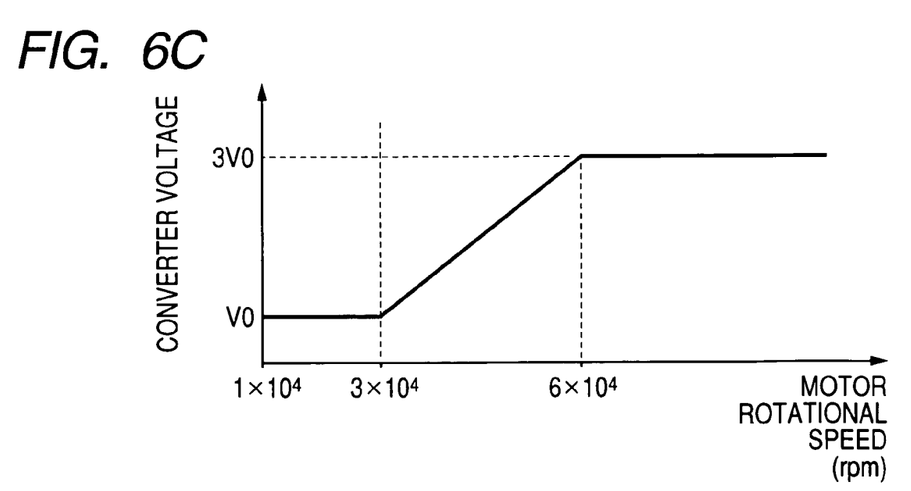
FIG. 6C is a graph showing a relationship between a converter voltage (i.e. an output voltage of the converter) and the motor rotational speed in accordance with the preferred embodiment of the present invention.

Furthermore, the control signal generating section 18, as shown in FIG. 6C, controls the above-described converter voltage controlling section 17 in accordance with an increase of the target rotational speed in the high-rotational speed region of the induction motor 2 (for example, in the speed range from $3 \times 10^4$ rpm to $6 \times 10^4$ rpm), thereby realizing a converter boosting control for obtaining a boosted output voltage of the converter 16 corresponding to three times the battery voltage (refer to the change from V0 to 3V0 shown in FIG. 6C). This operation corresponds to a function of the converter voltage control section. More specifically, when the target rotational speed given from the target setting section 29 is in the high-rotational speed region, the control signal generating section 18 controls the duty ratio in the converter voltage controlling section 17 in such a manner that a generated converter voltage corresponds to the target rotational speed.

In this case, a duty ratio control region of the inverter 12 and a duty ratio control region of the converter 16 can be set so as to overlap in part with each other.

Effect of Preferred Embodiment

The preferred embodiment having the above-described arrangement brings the following effects.

(1) The power control apparatus 3 is equipped with the converter 16 which is capable of boosting the voltage supplied to the inverter 12. Therefore, this embodiment can increase the voltage supplied to the inverter 12 giving a waveform drive signal to the induction motor 2. The current value received by respective inverter transistors 14 is small. As a result, this embodiment can reduce the cost of the inverter transistors 14 and accordingly reduce the cost of the power control apparatus 3.

(2) The inverter 12 and the converter 16 perform a cooperative power control in the rotational speed region (including the low-rotational speed region and the high-rotational speed region). Thus, this embodiment can decrease the heat concentrated on the inverter 12 so that a part of the generated heat is released to the converter 16. As a result, even if the power control apparatus 3 is installed to a portion subjected to severe thermal circumstances, this embodiment can assure a satisfactory thermal safety margin for each of the inverter 12 and the converter 16.

This will be explained in the following manner.

This embodiment causes the inverter 12 and the converter 16 to perform the power control cooperatively in accordance with the rotational speed region (including the low-rotational speed region and the high-rotational speed region). The inverter 12 and the converter 16 cause the loss in the following manner.

In the low-rotational speed region, the inverter 12 is subjected to the 'switching loss' resulting from the PWM drive control as well as the 'power supply loss' proportional to the duty ratio. On the other hand, the converter 16 operates in a constant duty rotational speed region and is accordingly subjected to the 'power supply loss' mainly. In short, the inverter 12 is bothered with the switching loss in the low-rotational speed region.

In the high-rotational speed region, the inverter 12 operates in a constant duty rotational speed region and is accordingly subjected to the 'power supply loss' mainly. On the other hand, the converter 16 is subjected to the 'switching loss' resulting from the PWM drive control as well as the 'power supply loss' proportional to the duty ratio. In short, the converter 16 is bothered with the switching loss in the high-rotational speed region.

As described above, the inverter 12 and the converter 16 are mutually different in the region where the switching loss is produced. However, this embodiment selectively uses the inverter 12 and the converter 16 to perform the power control in accordance with the rotational speed. This embodiment can decentralize generated heat between the inverter 12 and the converter 16. Decentralizing the generated heat in this manner enables the inverter 12 and the converter 16 to assure the thermal safety margin.

(3) This embodiment causes the inverter 12 and the converter 16 to perform the power control cooperatively in accordance with the rotational speed region (including the low-rotational speed region and the high-rotational speed region). This embodiment can thus reduce the burden of the inverter transistors 14 which simultaneously control the voltage and the frequency. This is effective in assuring long lifetime for respective inverter transistors 14. This leads to higher reliability of the power control apparatus 3. Furthermore, this embodiment reduces the burden imparted on each of the inverter transistors 14 and the converter transistors 25. This is also effective in enhancing the reliability of the power control apparatus 3.

(4) This embodiment causes the inverter 12 and the converter 16 to perform the power control cooperatively in accordance with the rotational speed region (including the low-rotational speed region and the high-rotational speed region). This embodiment enables the power control apparatus 3 to flexibly execute power control.

More specifically, when an automotive vehicle starts accelerating from a stopped condition, the motor is required to operate in a wide speed region ranging from the low speed region of $1 \times 10^4$ rpm to $2 \times 10^4$ rpm to the ultra-high speed region (for example, approximately $20 \times 10^4$ rpm). This embodiment first causes the inverter 12 to perform the variable power control and then causes the converter 16 to perform the variable power control, which realizes a smooth increase in the rotational speed.

On the other hand, when the vehicle starts accelerating in an intermediate driving condition, only the converter 16 performs the variable power control to realize a smooth increase in the rotational speed.

When the vehicle is continuously traveling on an ascending road or under other high load conditions, it is possible to supply a large amount of electric power to the induction motor 2 by maintaining a higher amplification degree in each of the inverter 12 and the converter 16.

In this manner, the inverter 12 and the converter 16 cooperatively optimize the power control in every rotational speed region, which can enhance the flexibility of the power control. Thus, it becomes possible to lower the control load of the power control apparatus 3.

(5) The waveform drive signal of a rectangular wave is given to the induction motor 2 throughout the entire rotational speed region. This enables the induction motor 2 to increase the rotational speed with a high drive torque and high response. Accordingly, the power control apparatus 3 needs to form no sine wave based on the PWM control, and thus the control load of the power control apparatus 3 can be reduced. The cost of the power control apparatus 3 can be reduced (6) The converter 16 includes a multiple-phase chopper type boosting circuits 26 whose phase number is equivalent to a boosting ratio. Using this chopper type boosting circuit is effective in increasing the boosting efficiency and in suppressing the load of each converter transistor 25. Furthermore, using the three-phase chopper type boosting circuit 26 is effective in obtaining substantially a constant boosted current and in suppressing the ripple of a boosted voltage.

Modified Embodiment

The above-described preferred embodiment of the present invention uses the induction motor 2 which can assist the turbo charger 7 to rotate. However, it is possible to utilize the induction motor 2 as a power generator in a particular driving phase that the actual rotational speed exceeds the target rotational speed.

More specifically, when the induction motor 2 produces surplus energy, the converter 16 can function as a means for reducing an induction voltage generated by the induction motor 2. The surplus energy can be stored in the battery 13.

The above-described preferred embodiment of the present invention uses the 6-phase induction motor as one example of the induction motor 2. However, the present invention is not limited to a particular phase number. The induction motor 2 can be constituted as a 3-phase or other plural phase number induction motor.

The above-described preferred embodiment of the present invention uses the three-phase chopper type boosting circuit 26. However, the converter 16 is not limited to a particular phase number as long as its phase number is equivalent to the boosting ratio. It is therefore possible to constitute the chopper type boosting circuit 26 as a two-phase type for realizing a double boosting function or as a four-phase type for realizing a quadruple boosting function.

The above-described preferred embodiment of the present invention discloses the induction motor 2 installed in the housing 9 of the turbo charger 7. However, it is possible to modify the rotary shaft 6 of the turbo charger 7 so as to extend out of the housing 9 and provide the induction motor 2 on the outside surface of the housing 9 so as to drive the protruded rotary shaft 6 of the turbo charger 7.

What is claimed is:

1. A power control apparatus for a motor-equipped turbo charger, comprising:
   a converter which receives a direct current voltage and boosts the direct current voltage to a boosted voltage;
   an inverter which receives the boosted voltage, generates a waveform drive signal of an output voltage from the boosted voltage, and gives the waveform drive signal to an induction motor to drive a rotary shaft of the turbo charger, the waveform drive signal having a waveform corresponding to a rotational speed of said rotary shaft driven by said induction motor; and
   a controller which controls the boosted voltage of said converter and controls the output voltage of the waveform drive signal outputted from said inverter, wherein said controller comprises:
   a control signal generating section which generates a control signal in accordance with an increase of a target rotational speed of said rotary shaft;
   a frequency controller which performs a frequency control for said inverter to increase a frequency of said waveform drive signal outputted from the inverter in accordance with the control signal;
   an inverter voltage controller which performs an inverter boosting control for said inverter to increase the output voltage of the waveform drive signal outputted from said inverter in accordance with the control signal when the rotational speed of said rotary shaft is within a low-rotational speed region; and
   a converter voltage controller which performs a converter boosting control for said converter to increase the boosted voltage outputted from said converter in accordance with the control signal when the rotational speed of said rotary shaft is within a high-rotational speed region.

2. The power control apparatus for a motor-equipped turbo charger in accordance with claim 1, wherein the waveform drive signal given to said induction motor has a rectangular waveform regardless of the rotational speed of said rotary shaft.

3. The power control apparatus for a motor-equipped turbo charger in accordance with claim 1, wherein said controller controls the output voltage of the waveform drive signal outputted from said inverter based on a duty ratio control and controls the boosted voltage outputted from said converter based on a duty ratio control.

4. The power control apparatus for a motor-equipped turbo charger in accordance with claim 1, wherein said converter includes a multi-phase chopper type boosting circuit whose phase number is equivalent to a boosting ratio of the boosted voltage to the direct current voltage, each phase of which includes a choke coil connected to a battery power source and a converter transistor controlling power supply to said choke coil.

5. A motor driven turbo charging apparatus, comprising:
   a turbo charger;
   a multi-phase induction motor for driving a rotary shaft of said turbo charger; and
   a power supply circuit for supplying electric power to said induction motor to drive said rotary shaft, wherein said power supply circuit comprises:
   a multi-phase converter circuit which receives a direct current voltage and boosts the direct current voltage to an output voltage;
   an inverter circuit for converting the voltage of said converter circuit into a multi-phase power and supplying said multi-phase power to said induction motor;
   a frequency control section which controls a switching frequency of the multi-phase power outputted from said inverter circuit;
   an inverter voltage control section which controls an output voltage of the multi-phase power outputted from said inverter circuit by adjusting a switching duty ratio of said inverter circuit; and
   a converter voltage control section which controls the output voltage of said converter circuit by adjusting the switching of said converter circuit, wherein
   said inverter voltage control section and said converter voltage control section are arranged so as to increase respective output voltages in accordance with an increase of a rotational speed of said rotary shaft driven by said induction motor,
   said inverter voltage control section controls the output voltage of said inverter circuit when the rotational speed of said rotary shaft is within a first rotational speed region, and
   said converter voltage control section controls the output voltage of said converter circuit when the rotational speed of said rotary shaft is within a second rotational speed region denoting a region of a rotational speed higher than that in said first rotational speed region.

6. The motor driven turbo charging apparatus in accordance with claim 5, wherein
   said converter circuit has a six-phase or less-phase switching circuit including switching elements provided for respective six or less phases;
   said inverter circuit has a six-phase bridge circuit including switching elements provided for respective six phases to provide six power signals having respective six-phase rectangular waveforms to said induction motor as the multi-phase power; and
   said induction motor has six-phase windings receiving the respective six power signals from said inverter circuit.

7. The power control apparatus for a motor-equipped turbo charger in accordance with claim 1, wherein said controller controls the boosted voltage of said converter and the output voltage of the waveform drive signal in accordance with an assist amount to be given to said turbo charger and the rotational speed of said rotary shaft.

* * * * *